April 9, 1957 L. CANEPA 2,788,049
NON-SKID DEVICE FOR PNEUMATIC TIRES
Filed March 3, 1955

United States Patent Office 2,788,049
Patented Apr. 9, 1957

2,788,049

NON-SKID DEVICE FOR PNEUMATIC TIRES

Luigi Canepa, Turin, Italy, assignor to the Firm Michele Pesce, Turin, Italy

Application March 3, 1955, Serial No. 491,846

Claims priority, application Italy March 6, 1954

2 Claims. (Cl. 152—239)

This invention relates to a non-skid device for pneumatic tires, more particularly for driving on frozen roads, of the type comprising a plurality of gripping members arranged transversely of the tire tread and in contact therewith and connected at their ends to two endless deformable members arranged circumferentially on both tire sides.

Various types of non-skid devices are known, which suffer, however, from various drawbacks, inter alia side slipping on braking, considerable wear of the tire, noisiness, high power absorption, consideraable wear of the non-skid devices which constantly expose the same surface to the road, mechanical vibrations imposed on the vehicle and full uselessness on drive on frozen roads.

It is the purpose of this invention to provide a non-skid device for pneumatic tires, which substantially avoids all the above mentioned drawbacks, more particularly to provide a non-skid of the type referred to specially suitable for driving on frozen roads through a satisfactory adhesion of the tire to the road surface even when braking over curves.

A second purpose of this invention is to provide a non-skid device which highly reduces wear of the tire to which it is fitted and wherein the wear of the non-skid device itself during drive is minimized.

A third purpose of this invention is to provide a non-skid device of the type referred to which is noiseless, does not subtract power from the engine nor objectionably stresses the transmission members.

A fourth purpose of the invention is to provide a non-skid device of the type referred to, which is of reduced weight as compared with prior non-skid devices, simpler in construction, hence less expensive.

My improved non-skid device distinguishes in that the operating members each comprise a flexible inner support, an external body adapted to contact the ground arranged about its support and rotating thereon and means for connecting the support ends to the endless deformable members arranged circumferentially on both tire sides.

Further characteristic features of this invention will be understood from the appended specification referring to the accompanying drawings, which show by way of example an embodiment thereof.

Figure 1:
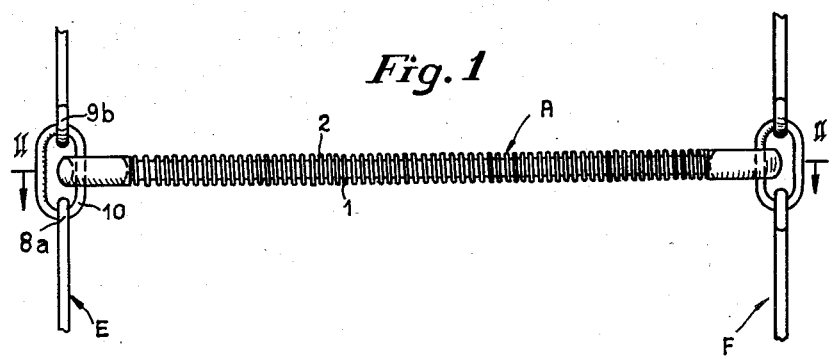
Figure 1 shows a gripping member of the non-skid device connected at its ends to the endless deformable members.
Figure 2:
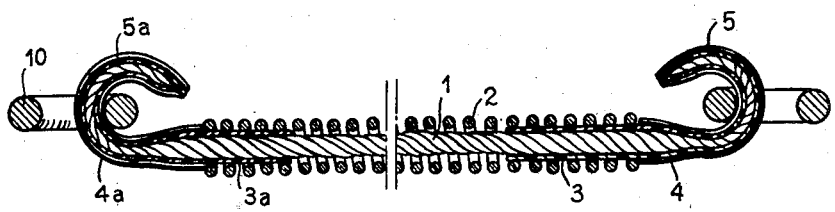
Figure 2 is a sectional view on line II—II of Figure 1 on an enlarged scale partly broken away.

Referring to the drawings, the non-skid device comprises a plurality of gripping members A, B, C, D etc. arranged transversely of the tire in contact with the tread and connected at their ends to two endless deformable members E, F.

Each gripping member comprises a flexible inner support, for instance in the form of a metallic cable 1, having arranged thereabout a rotatable member comprising for instance a helix 2 of harmonic steel wire of which the inner diameter materially exceeds the outer diameter of cable 1.

Small tubes 3 of resilient abrasion resistant material, such as plastics as for example polyvinyl chloride, are fitted on the ends of the cable 1 and are inserted over a certain length between the cable 1 and metallic helix 2. The tubes 3 extend along the cable 1 at the region between the tread and tire sides at the tire edge where because of the sharp bend, that the cross-pieces undergo at that point, there is added stress and wear. In the absence of such resilient means the spring 2 and cable 1 would be subjected to excessive frictional contact and excessive wear. Because it is deformable and of an abrasion resistant material it performs the functions of a dry lubricant.

Figure 3:
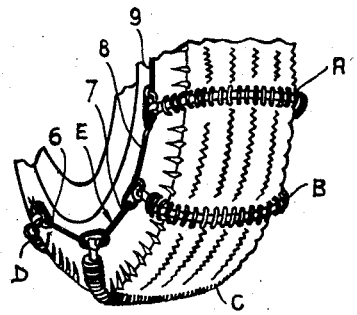
Figure 3 is a perspective view of the non-skid device fitted to the tire.

Small metallic tubes 4, 4a respectively, are fitted on the ends of the tubes of deformable material 3, 3a, the tubes 4, 4a being shorter than tubes 3, 3a and being successively flattened to securely hold the cable and deformable tube. The units comprising the ends of cable 1, tubes 3, 3a of deformable material and metallic tubes 4, 4a respectively, are then bent to hook-form, as shown at 5, 5a respectively. Said hooks serve for fastening the gripping members A, B, C etc. to the endless deformable members E, F arranged circumferentially on both tire sides and comprising a number of rods (Figure 3) 6, 7, 8, 9 etc. forming a loop at their ends, for instance at 8a, 9b, respectively, which is engaged by an oblong ring 10, which is also engaged by one of the hooks, for instance 5a formed at one end of an operating member.

The rotatable member shown on the drawings is a wire helix with relatively widely spaced turns. However, the turns can be much closer in order to prevent penetration therebetween of pebbles or other foreign bodies.

It will be obvious that when the gripping member bears on the road, it cannot rotate with respect to its support to which it is firmly applied, while as the gripping member is brought into contact with and removed from the road it is capable of a slight rotation in order to constantly expose another portion of its peripheral surface to the road. Consequently, the rotatable member undergoes uniform wear, which insures a long life thereof. Moreover, its helical configuration creates in the ice upon contact of the non-skid device with the frozen ground, grooves generally parallel to the direction of displacement of the vehicle. The flanks of the grooves cooperating with the flanks of the turns of the helix prevent side slipping of the vehicle. On account of the reduced bearing surface of the operating members on the ground, the said members can penetrate into the ice and afford a firm grip which prevents skidding of the tire.

What I claim is:

1. In an anti-skid device for tires, a pair of circumferentially extending side members adapted to be disposed at opposite sides of a tire and a plurality of spaced cross-pieces extending transversely over the periphery of the tire from one side member to the other, each of said cross pieces comprising a multi-strand flexible cable and metal tube sections enclosing opposite end portions of said cable, each of said tube sections closely embracing the cable and having an outer end portion that is flattened and bent into the form of a hook and an inner end portion of approximately circular cross section, a plastic tube disposed around the entire length of said cable portions engaged by said flattened and hook shaped portions of said metal tube sections and extending inwardly beyond said metal tube sections along a portion of said cable, said hooks engaging said side members and thereby securing said cross-pieces and each of said cables extending substantially throughout said flattened and hook shaped portions of said tube sections and being thereby securely anchored to said sections and to said side members.

2. In an anti-skid device according to claim 1, in which a helical spring is disposed between the inner ends of said metal tube sections and overlies said plastic tube extending inwardly beyond said metal tube sections.

References Cited in the file of this patent

UNITED STATES PATENTS

| | | |
|---|---|---|
| 1,478,420 | Baumeister | Dec. 25, 1923 |
| 2,252,027 | Pasquarella | Aug. 12, 1941 |
| 2,589,207 | Welsh | Mar. 11, 1952 |

FOREIGN PATENTS

| | | |
|---|---|---|
| 493,076 | Canada | May 28, 1953 |